US008113591B2

(12) United States Patent
Cassaday (10) Patent No.: US 8,113,591 B2
(45) Date of Patent: Feb. 14, 2012

(54) APPARATUS AND METHOD FOR PRODUCING A VENTILATED CHAIR BACKING ASSEMBLY (76) Inventor: Terry Cassaday, Mississauga (CA)

(*) Notice: Subject to any disclaimer, the term of this patent is extended or adjusted under 35 U.S.C. 154(b) by 351 days.

(21) Appl. No.: 12/269,103

(22) Filed: Nov. 12, 2008

(65) Prior Publication Data
US 2010/0117433 A1 May 13, 2010

(51) Int. Cl.
A47C 7/02 (2006.01)
(52) U.S. Cl. .................................. 297/452.46
(58) Field of Classification Search ............ 297/452.46, 297/452.43, 452.37, 180.14
See application file for complete search history.

(56) References Cited

U.S. PATENT DOCUMENTS

| 1,968,762 | A | * | 7/1934 | Hamblin, Jr. | 297/452.43 |
| 4,556,254 | A | * | 12/1985 | Roberts | 297/452.36 |
| 5,039,158 | A | * | 8/1991 | Maier | 297/452.37 |
| 5,597,200 | A | * | 1/1997 | Gregory et al. | 297/180.13 |
| 7,108,319 | B2 | * | 9/2006 | Hartwich et al. | 297/180.1 |
| 7,213,876 | B2 | * | 5/2007 | Stoewe | 297/180.14 |
| 2002/0003362 | A1 | * | 1/2002 | Kunkel et al. | 297/180.14 |
| 2002/0096931 | A1 | * | 7/2002 | White et al. | 297/452.42 |
| 2005/0243331 | A1 | * | 11/2005 | Ishima et al. | 356/614 |

* cited by examiner

Primary Examiner — Milton Nelson, Jr.

(57) ABSTRACT

The present invention relates to an apparatus for a ventilated chair backing assembly comprising: a foam chair backing component with a first plurality of ventilation holes extending from a front surface to a back surface, said plurality of holes having a skin; an internal support component with a second plurality of ventilation holes extending from a front surface to a back surface aligned to the first plurality of holes.

4 Claims, 8 Drawing Sheets

APPARATUS AND METHOD FOR PRODUCING A VENTILATED CHAIR BACKING ASSEMBLY

FIELD OF INVENTION

The present invention relates to an apparatus and method for producing a ventilated chair backing assembly. In particular the present invention relates to a ventilated molded back sectional component along with a method for producing the molded back sectional component.

BACKGROUND OF INVENTION

Traditional chairs tend to be of a solid, dense mass. Although this solid, dense mass allows for support of the occupant, it does not allow for air circulation between the chair and the occupant. Consequently, such lack of air circulation can create extreme heat accumulation where the occupant's body contacts the chair causing excessive sweating. With an open foam material, the moisture build up can provide an environment for mould or bacteria to thrive.

Although the occupant may control the climate around them, the lack of airflow between the chair and the occupant's body prevents any kind of climate control in that area. Furthermore, in cold climates, the reverse happens wherein the area where the occupant's body contacts the chair does not allow for heat flow; thus, creating cold pockets preventing heating of that area of the body. Prior art has attempted to solve this ventilation problem.

U.S. Pat. Nos. 7,100,978, 6,840,576, and 6,629,724 to Ekem et al. disclose a portable ventilated seat assembly. The seat assembly consists of a porous material forming an upper surface layer, a non-porous first inner layer adjacent to the upper surface layer, a non-porous layer forming a lower surface-layer and an expanded space material between the non-porous layer. The assembly further consists of a fan coupled with the air space between the non-porous layers for ventilating the seat assembly. Although the invention is a porous structure with a self contained ventilation system, which may provide ventilation to the occupant, this ventilation is limited. The ventilation is limited by the fact that this assembly is portable and is to be placed on a traditional chair, which has minimal ventilation; thus, the problem remains wherein airflow is minimized between the chair and the seat assembly. Furthermore, the fan used in this assembly may be costly to maintain and repair, making this invention uneconomical.

U.S. Pat. No. 6,629,728 to Losio et al. discloses a bicycle seat, which comprises of an aperture that is connected to the anterior portion of the seat frame. The aperture is position in a direction of forward travel of the bicycle. Furthermore, the aperture is connected to an air distribution channel and also to a plurality of air discharge openings to ventilate the seat surface. Although this invention allows for ventilation of the seat, the ventilation is only directed to certain areas of the seat. The directional airflow is controlled by the aperture and the air distribution channel which is only located at the anterior of the seat; thus, ventilation only occurs at the anterior of the seat. Furthermore, this ventilated seat system is designed for a bicycle; thus, it only addresses ventilation problems for the seating area and does not address ventilation for the back rest area.

Another solution to solving the ventilation problem of a traditional chair is the process by which the materials of the chair are made. The use of foam as a material to make traditional chairs has been well documented due to its malleability and porous nature. However, problems of rigidity and durability have arisen when the foam is molded to form holes for air circulation. Due to the foam's soft, malleable nature, its rigidity is lost when ventilation holes are cut into the foam to increase its airflow nature; thus, limiting its ability to create an effective ventilated chair. The prior art has attempted to solve this problem in its different methods of producing the foam material.

U.S. Patent Application No. 2007/0125780 to Shiina et al discloses a process for producing plastic foam composite. Specifically the invention relates to a foam composite with a skin that is formed "in one shot" by charging plastic powders or minute particles together with polyolefin pellets that can be cross-linked and foamed in a mold, and heating the mold while rotating. This composite absorbs almost no moisture, and has satisfactory strength. The process disclosed produces foam that is strong and rigid; however, the foam produced is not very porous and does not have uniformly shaped air holes, which allow for air circulation. Thus, the foam formed from this process is not ideal for use in making ventilated chairs.

SUMMARY OF INVENTION

An aspect of this invention comprises an apparatus for a ventilated chair backing assembly comprising a foam chair backing component with a first plurality of ventilation holes extending from a front surface to a back surface, said plurality of holes having a skin.

Another aspect of the present invention is a ventilated chair backing assembly comprising a foam chair backing component with a first plurality of ventilation holes extending from a front surface to a back surface; an internal support component with a second plurality of ventilation holes extending from a front surface to a back surface aligned to the first plurality of ventilation holes; and an outer ventilated backing support component including a plurality of ventilation ribs wherein the ventilation ribs permit airflow from the aligned first and second plurality of ventilation holes.

A further aspect of the present invention is a method for producing a foam molded back sectional component for a ventilated chair assembly comprising placing an upper mold section with a plurality of rods adjacent to a lower mold section in an open position; moving the upper mold section to the lower mold section in a closed position to define an internal cavity wherein the rods extend into the cavity; injecting a foam into the cavity; allowing the foam to set; moving the upper mold section from the lower mold section to the open position to remove the molded component.

BRIEF DESCRIPTION OF THE FIGURES

FIG. 11: illustrates the chair back seen from the front, where the fabric displays the plurality of holes and ribs there through.

DETAILED DESCRIPTION

Figure 1:
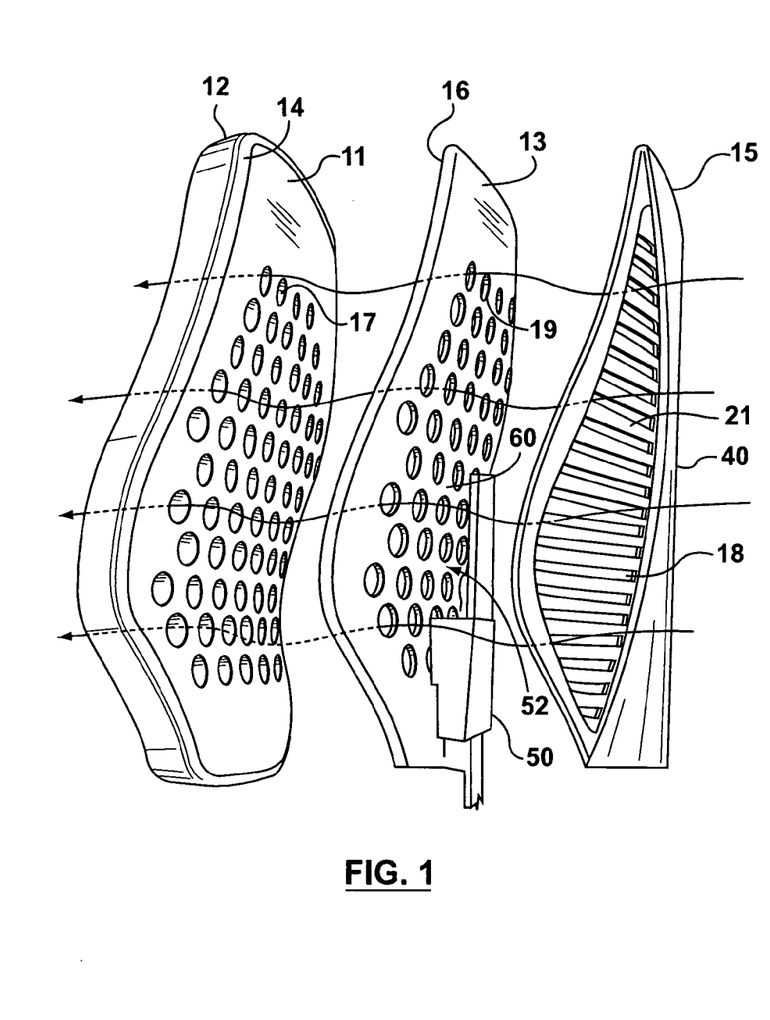
FIG. 1: illustrates an exploded view of the ventilated chair back assembly.

The present invention pertains to both a ventilated chair assembly in addition to the method for producing the molded foam of the back support sectional component of the ventilated chair assembly. As depicted in FIG. 1 the ventilated chair assembly is comprised of three components: an injected foam molded component 11, an internal ventilated support component 13, and an outer ventilated backing cover component 15. The injected foam molded component 11 is further comprised of a first plurality of holes 17 which extend through the foam molded component 11. The first plurality of holes 17 provide for airflow thereby assisting in overall ventilation of the seat. To further ensure that the airflow passageway is kept open, the first plurality of holes 17 are aligned to a second plurality of holes 19 located in the internal ventilated support component 13. The internal ventilated support component 13 mirrors or conforms to the shape of the injected foam molded component 11 and subsequently readily receives the injected foam molded component 11 as shown in the assembled state of FIG. 3. In addition, the injected foam molded component 11, may be affixed with a permeable fabric 12 to ensure that airflow is maintained through the fabric, aligned holes 17 and 19 and support component 13.

Figure 2:
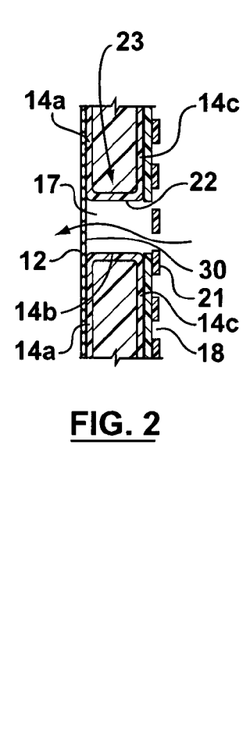
FIG. 2: illustrates a vertical cross sectional view (along line 2-2 (see FIG. 3)) of the ventilated chair back assembly.

FIG. 2 further depicts the cross section of an individual airflow hole 23 through the injected foam molded component 11. In addition it can be further shown that the plurality of holes 17 have an outer skin 14a, 14b, 14c that continues along both the front and back surfaces of the injected foam molded component 11. The plurality of holes 17 are formed during the injection molding step further described by FIGS. 5 to 8.

Figure 3:
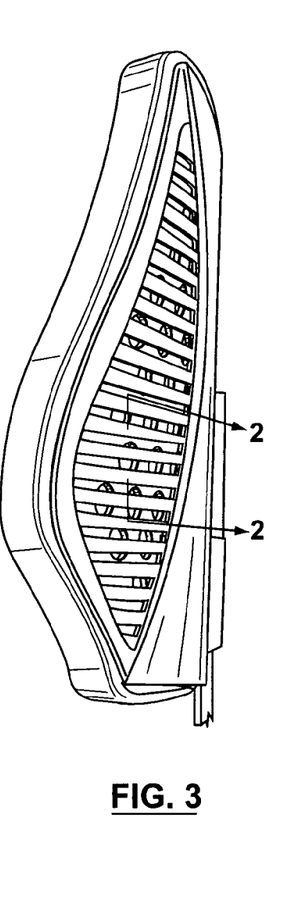
FIG. 3: illustrates a side view of the assembled ventilated chair back.

FIG. 3 illustrates the ventilated chair back in an assembled state with all three components 11, 13, 15 in close association with each other. FIG. 3 further illustrates that once the chair is in an assembled stated, the first plurality of holes 17 from the injected foam molded component 11 are aligned to the second plurality of holes 19 of the internal ventilated support component 13. Further, it can be viewed that the plurality of ventilation ribs 21 permit the circulation of airflow through the assembled chair.

The fabric 12 can be secured to the injected foam molded component 11 by an adhesive, staples, stitching or other known fastening mechanism. In particular, the outer periphery 14 overlaps the injected foam molded component and contacts the outer periphery 16 of the internal ventilated support 13 as depicted in the assembly shown in FIGS. 1 and 3.

Figure 4:
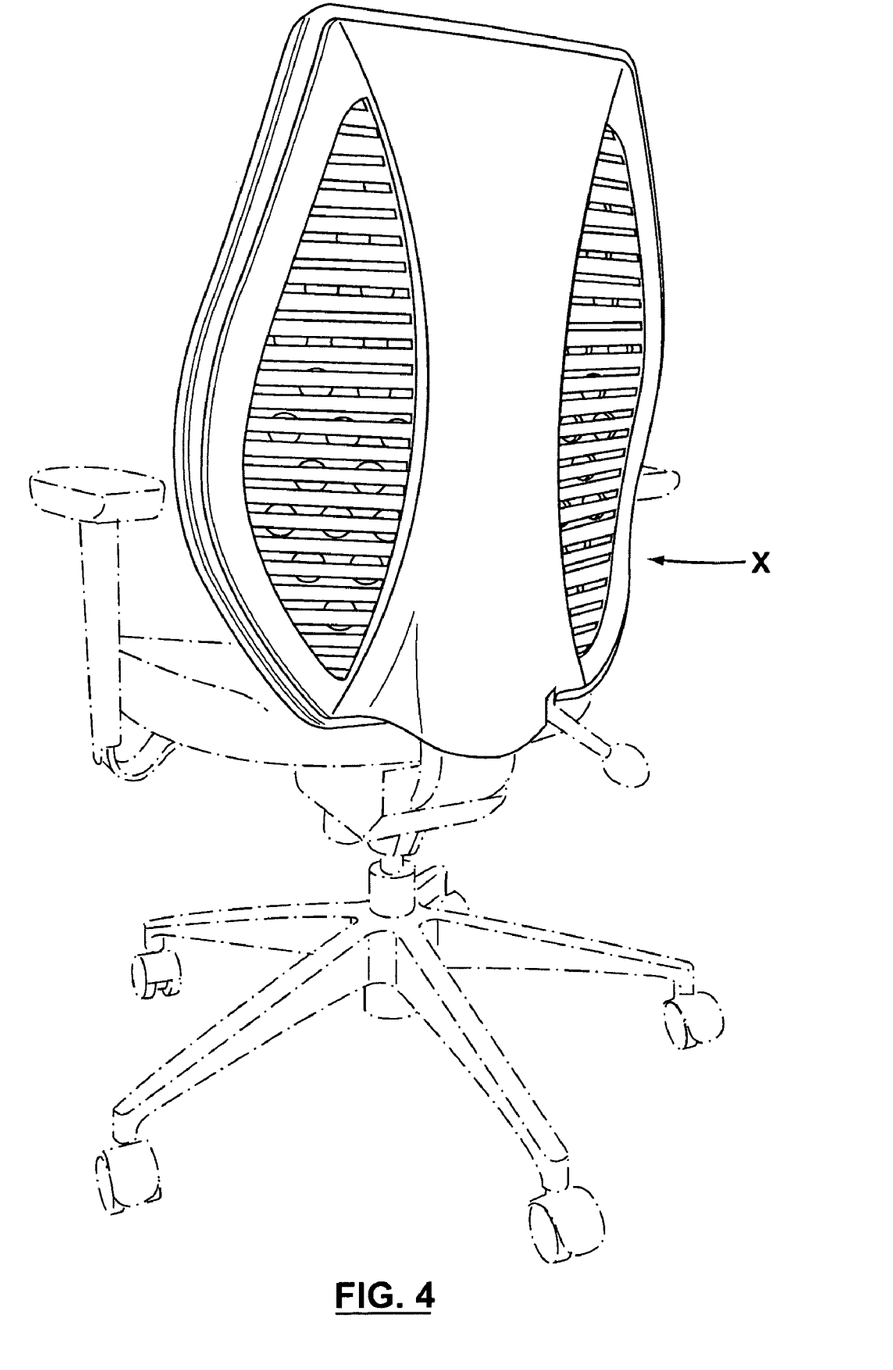
FIG. 4: illustrates a rear perspective view of the ventilated chair assembly.
Figure 5:
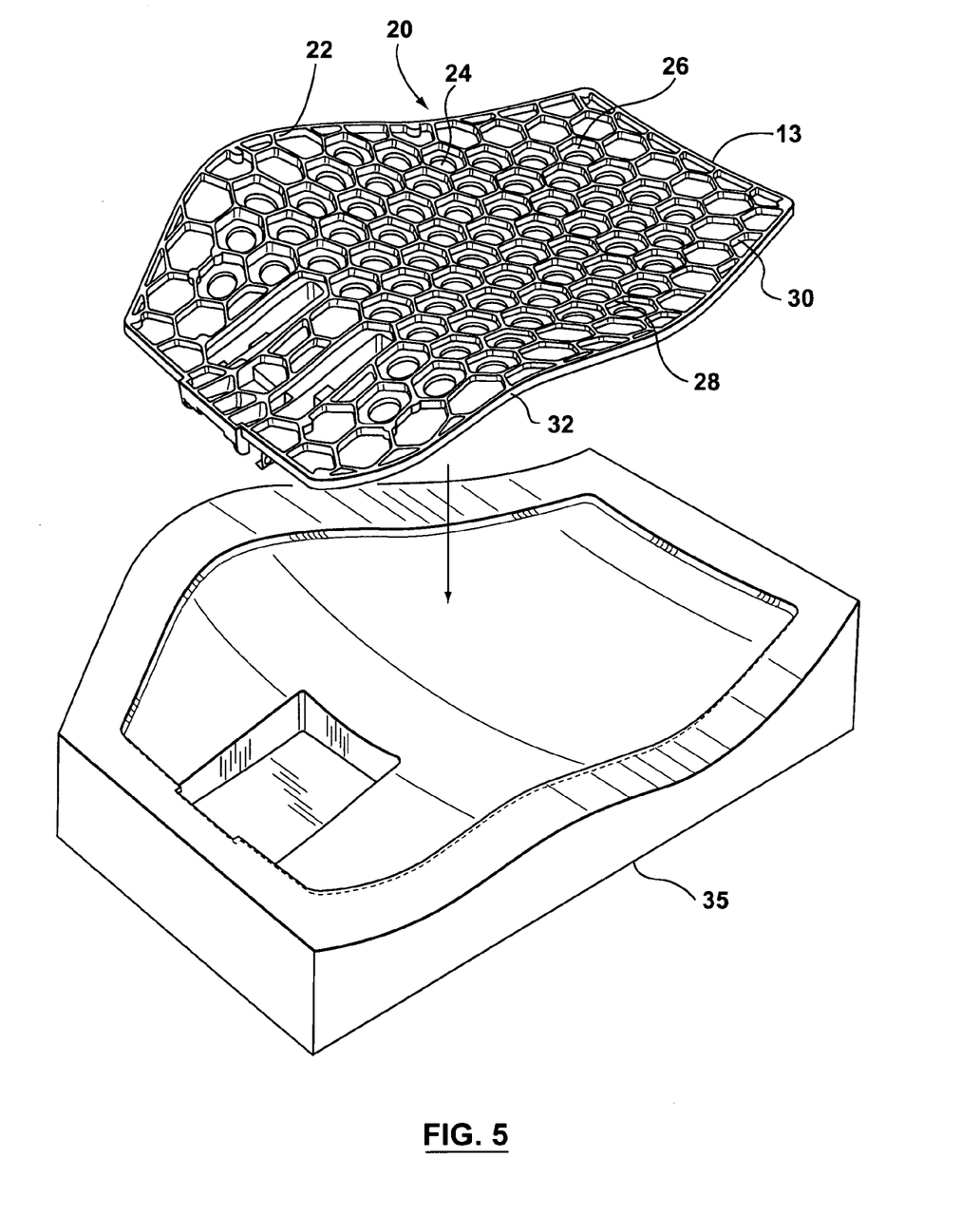
FIG. 5: illustrates a perspective view of the internal ventilated support component being placed adjacent to the bottom reservoir.

The injected foam molded component 11 and the internal ventilated support component 13 are capped by the third component, the outer ventilated backing cover component 15. Similar to the internal ventilated support component 13, the outer ventilated backing support component covers the injected foam molded component 11 and provides for ventilation in a number of directions to be described herein. In addition, the outer ventilated backing cover component 15 is further comprised of a plurality of ventilation ribs 21 having openings 18 there between. In a similar manner as do the plurality of airflow holes 17, 19 of the first two components of the chair 11, 13 the plurality of ventilation ribs 21 assist in allowing for airflow through the chair assembly. The ventilated support component 13 comprises of a shell structure which is produced in an injection mold or the like in a manner well known to those persons skilled in the art. The front face 20 of the ventilated support component is shown in FIG. 5 and after production includes a plurality of cells 22 joined together. Some of the cells have a hole 19 there through, a landing or surface 26 which defines the hole 19 and an upstanding wall 28. The cells are joined together to form a rigid but lightweight structure and in the embodiment shown in FIG. 5 are honey combed in shape. Some of the peripheral cells 30 do not have a landing 26. The ventilated support component 13 has a peripheral edge 16 which presents a surface that will receive fastening means such as staples screws or the like. The back side of the ventilated support component is shown in FIG. 1. In one embodiment, the ventilated support component 13 comprises nylon. FIG. 4 illustrates a rear perspective view of the ventilated chair assembly. Further, FIG. 4 illustrates the interaction of the ventilated chair backing in an assembled state with the additional components of a chair assembly such as a seat, arm rests, and base support (in stippled lines).

Once the internal ventilated support component 13 is produced as described above it can be placed into another mold. FIG. 5 illustrates a perspective view of the internal ventilated support component 13 being placed adjacent to the bottom reservoir 35 forming the bottom section of a mold to be described herein.

Figure 6:
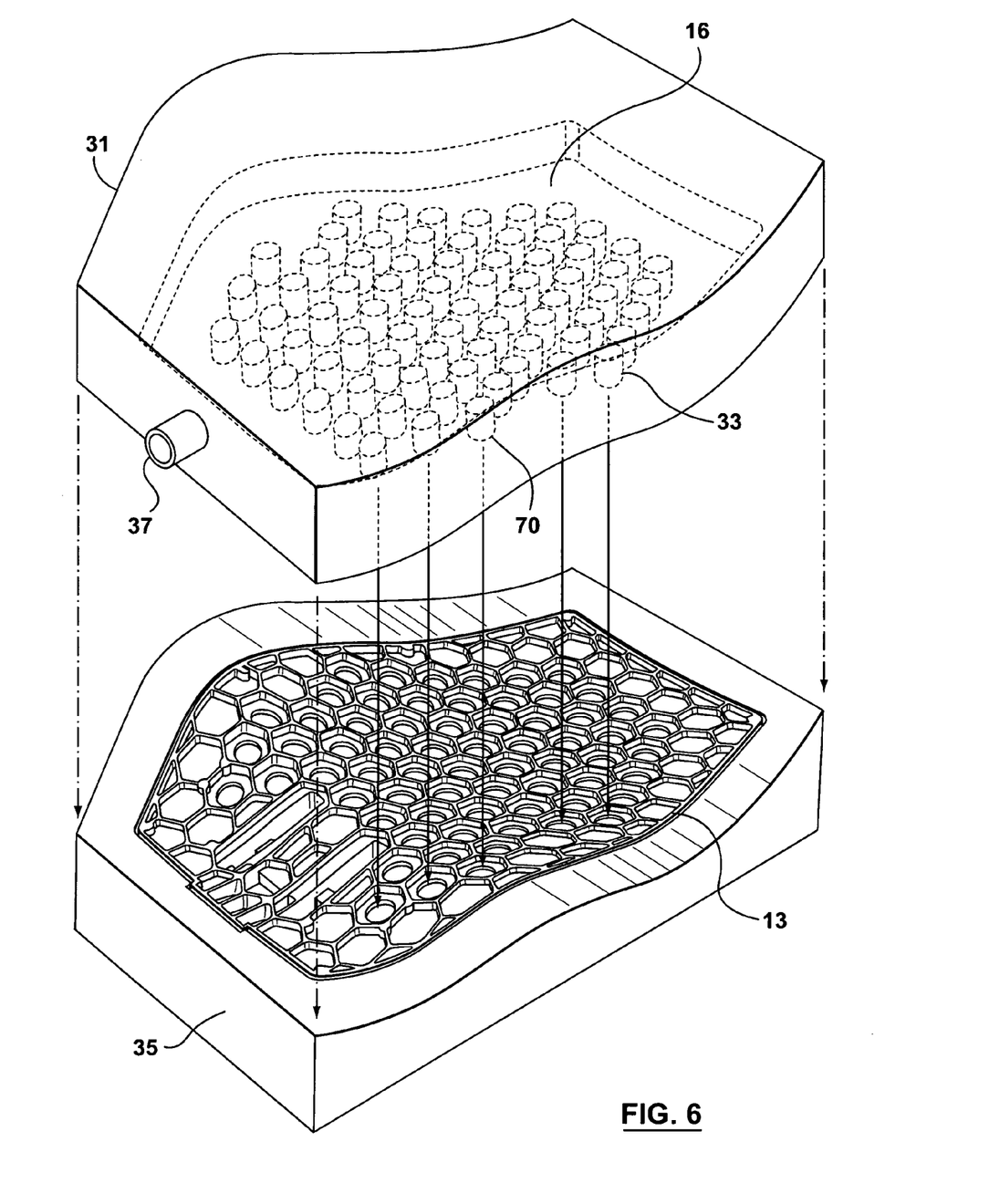
FIG. 6: illustrates an exploded perspective view of the foam mold injection utility.
Figure 7:
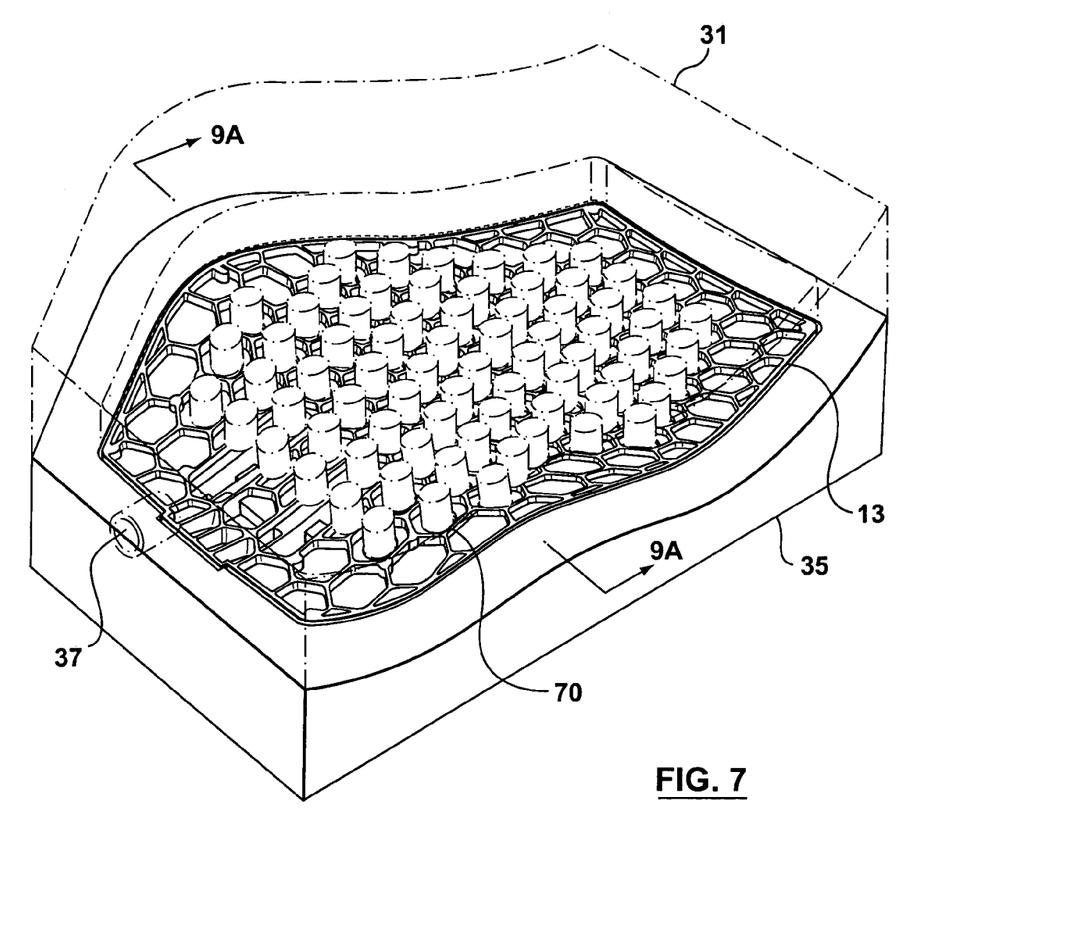
FIG. 7: illustrates the foam mold injection utility.

FIG. 6 illustrates an exploded perspective view of the foam mold injection utility in an open position. The utility is comprised of a horizontal upper surface or mold section 31 which registers with a lower surface or lower mold section 35 to define an internal mold cavity 16 there between. The internal ventilated support component 13 can be placed into the bottom portion of the lower mold section 35. The upper mold section 31 is further comprised with a plurality of vertical rods 33 that can be controlled by a computer or the like.

In particular each rod 33 of the plurality of rods 33 is individually controlled as to the length of projection into the cavity 16. More specifically, one end 70 of each of the rods is adapted to contact the landing 26 of a cell 22. The length of projection of the vertical rods 33 into the cavity 16 is determined by the shape of the chair back; as the vertical rods form the plurality of holes 17 of the foam molded component 11 and therefore extend there through throughout. The rods 33 are adapted to move or be displaced in the direction of "V" by a number of well known means which can be controlled by a computer. When the ends 70 of the rods 33 contact the landing 26 the rods will form the plurality of holes 17 once the foam molded component is removed from the mold cavity 16.

The horizontal plate or upper mold section 31 closes in a sealed manner to a bottom mold section 35 to provide a mold cavity 16 there between. Together, the upper mold section 31 and the bottom mold 35 are individually cast in such a manner as to dictate the shape of the injected foam molded component 11. Once the upper mold section 31 and the surface of bottom mold section 35 are sealed, the rods 33 of the upper mold 31 are displaced by the computer controls (not shown) to meet the bottom mold section 35 in a flush manner. A plastic foam is injected into the mold cavity at an elevated temperature by way of an injection opening 37. In one embodiment of the invention the plastic foam material can comprise polyurethane, or other plastic material. Any foam substance can be used to provide a support for a person resting against the chair back.

Alternatively the rods 33 can be fixed to the upper mold section 31.

A skin 22 is formed during the cooling of the injected foam material so as to provide a polyurethane outer layer or skin 22 having a different density than the remainder of the part as the outer surface cools faster than the interior to provide a layer with a different density than the interior. In one embodiment the foam material is injected into the cavity 16 at a temperature of around 170 degrees centigrade under pressure and the foam material expands to fill the cavity 16. As the foamed material hits the sides of the upper and lower mold the outer surface of the foam will cool faster than the interior, thereby providing a skin. Furthermore the foam adheres to the internal ventilated support component 16 as illustrated in FIG. 8b, so that when the foamed molded component is removed from the mold cavity 17 the ventilated support component 13 also is pulled from the cavity 16 in one unitary piece with the holes 17 and 19 aligned.

Alternatively once the foam mold has set, the mold may then be coated with a sealant such as a polyurethane coat or skin. This skin permeates and covers every outer surface of the foam molded component 11. The subsequent polyurethane coat assists the foam molded component by minimizing moisture absorption thereby prolonging the life of the chair, assisting with shape memory and cushioning of the foam component. Also there is less likelihood of moisture entering the interior of the foam material where mould or bacteria could form. This improved cushioning and shape memory is further improved as the polyurethane coat extends through the foam molded component 11, by way of coating the plurality of holes 17.

Figure 8A:
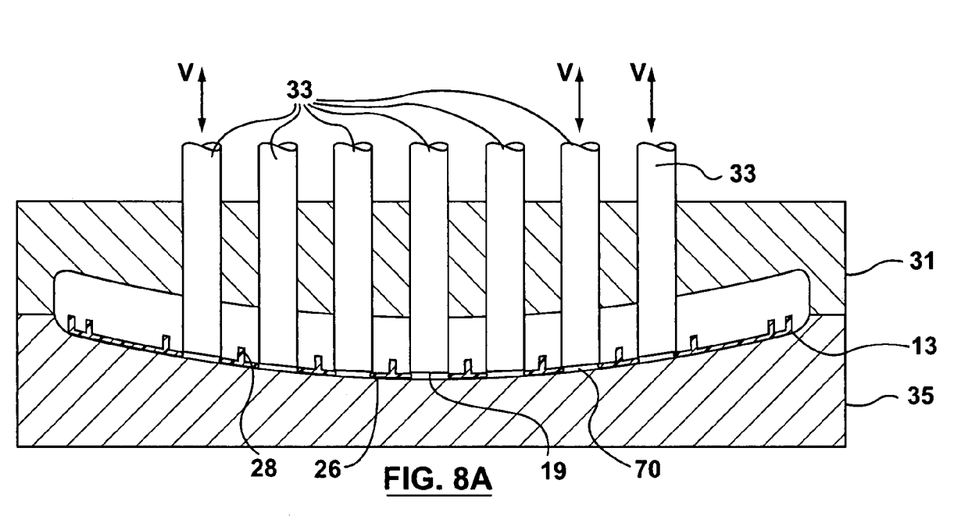
FIG. 8A: illustrates a cross sectional view of the foam mold injection utility along line 8A.
Figure 8B:
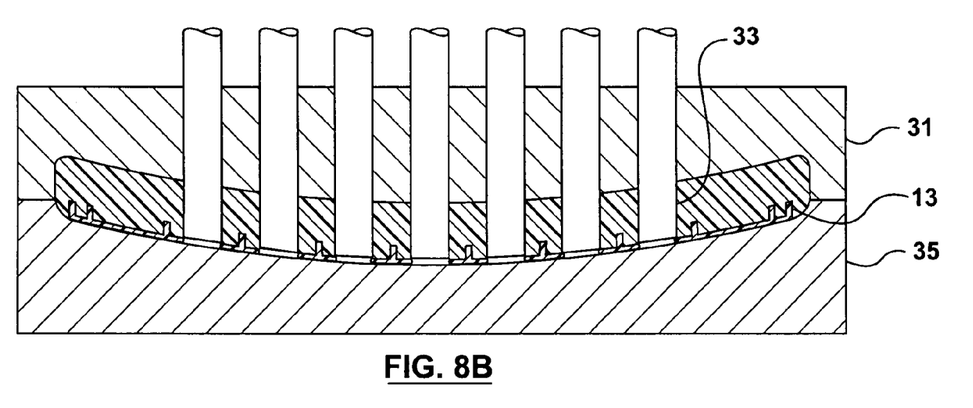
FIG. 8B: illustrates a cross sectional view of the foam mold injection utility along line 8A after the foam has been injected.

FIG. 8A illustrates a cross sectional view of the foam mold injection utility along line 8A. As one may observe, the rods 33 of the horizontal plate 31 are aligned with the openings 19 of the internal ventilated support component 13 in such manner as to define a cavity. As depicted in FIG. 8B, the plastic foam is injected into the cavity 11 as defined by the upper mold section 31 and the internal ventilated support component 13 resting on the lower mold section 35.

Figure 9:
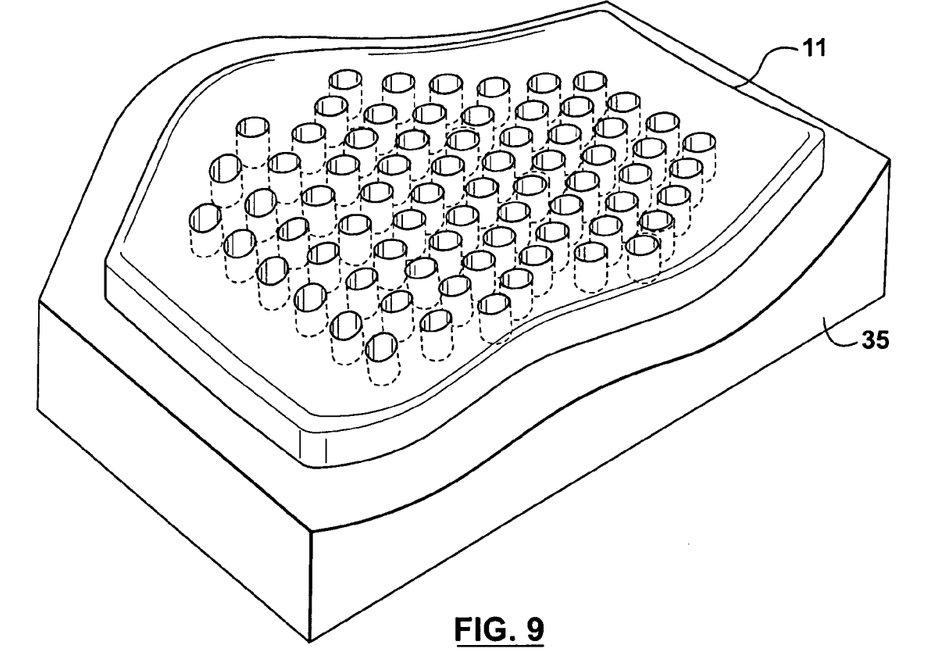
FIG. 9: illustrates a perspective view of the foam mold injection utility without the upper mold section.
Figure 10:
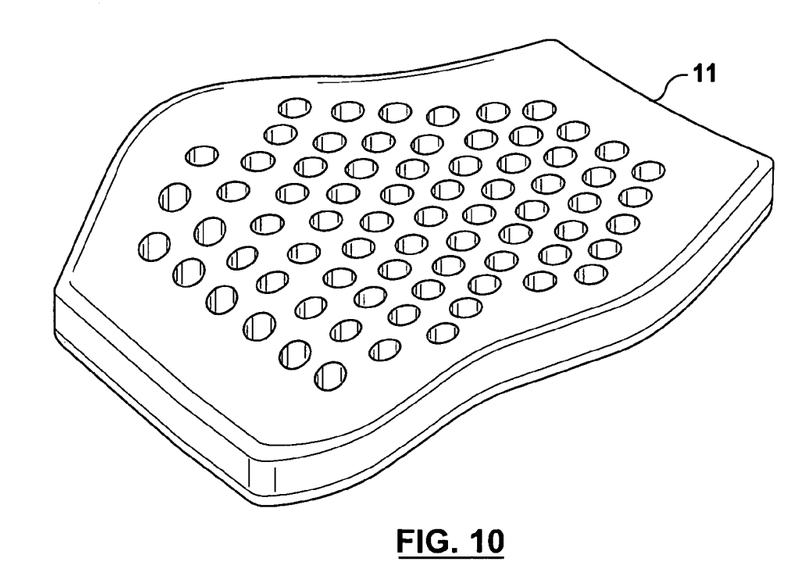
FIG. 10: illustrates a perspective view of the injected foam molded component.

As depicted by FIG. 9, once the injected foam molded component 11 sets, the upper molds section 31 is removed from the lower mold section 35. The injected foam molded component 11 is then removed from the lower mold section 35 as depicted in FIG. 10.

It should be further noted that the plurality of holes 17 are generally disposed such that the axis 30 of the plurality of holes 17 are substantially parallel to each other as depicted in FIG. 2. It has been found that the plurality of holes 17 each having an outer layer or skin 22 formed during the molding process provide superior crush resistance or strength when compared to the same foam material having the same holes that have been formed after the molding process but punching or cutting of the holes 17 after the molding process. The superior crushing resistance is in the direction of the axis 30, that is in the direction of the centre lines of the holes. The section of the skin 22 which is disposed substantially parallel to the axis 30 have an additive effect in providing increased strength and provide a firmer foam having increased strength resistance.

In addition, the ventilated back cover component 15 has a generally straight back 40 portion as depicted in FIGS. 1 and 4 to hide the mechanics of the height adjustment mechanism 50. However, the wing portions of the back support component 15 are curved or convex as illustrated in FIG. 4. Moreover the lower lumbar section 60 in the medial area of the internal ventilated support component 13 is also curved (i.e. concave relative to the straight portion 40 so as to provide cross ventilation through the opening 18 between the ribs 21). In other words, the chair back is ventilated in the direction of the axis 30 of the plurality of holes 17 and 19; plus cross ventilated between the internal ventilated support component 13 and outer ventilated, backing support component 15 in direction X as shown in FIG. 4 which can be perpendicular to the plurality of axis 30, or at an angle therefrom. In other words, the space 18 between the ribs 21 provides ventilation to the holes 17 and 19 and between the internal ventilated support component 13 and back support component 15. More specifically there is a space between the portion 40 and the lower portion 52 of support 13 so that cross ventilation can occur in the direction X.

Figure 11:
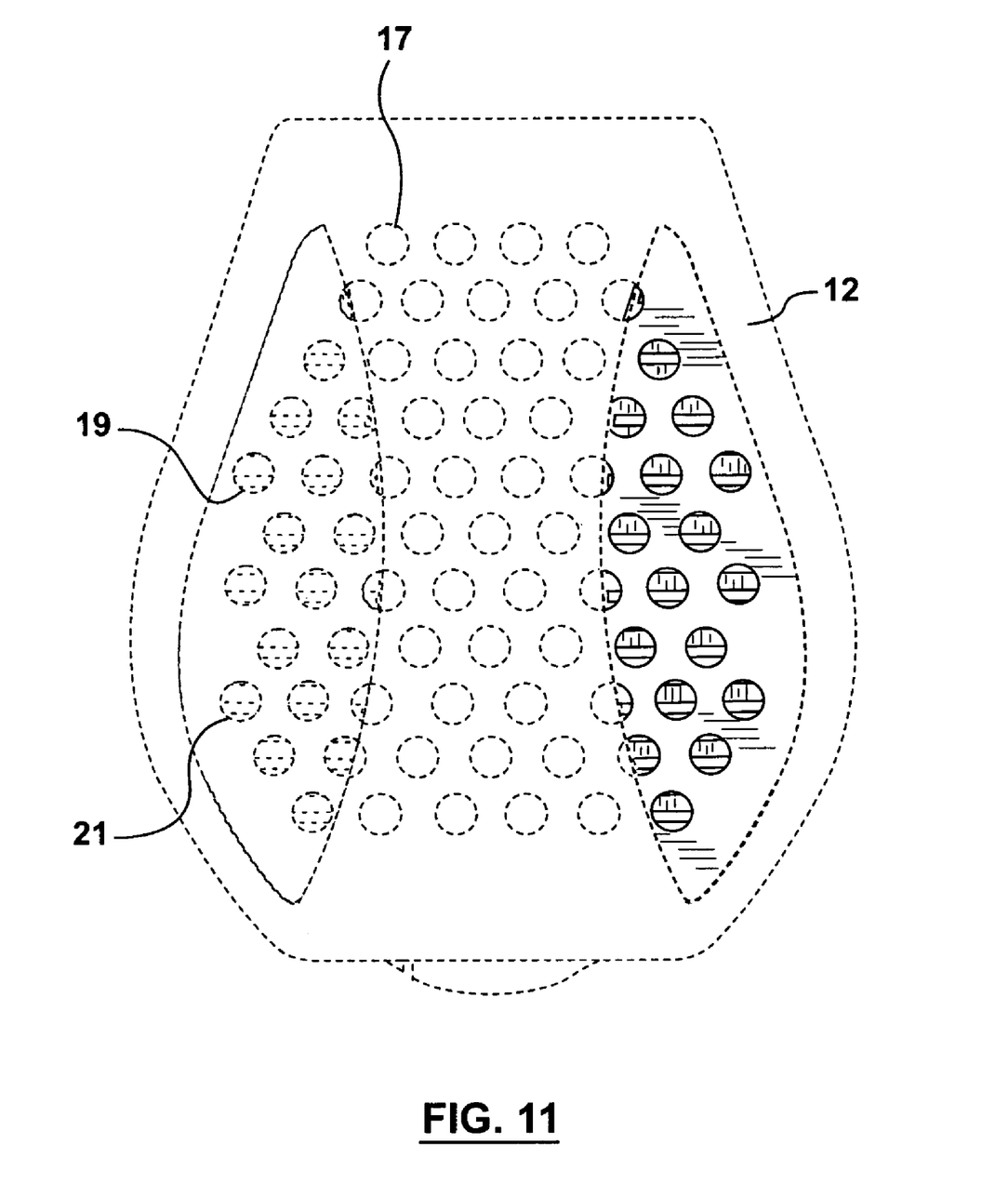

The fabric 12 also provides the passage or ventilation of air therethrough. In other words the chair described herein enables the flow of air to the body. The airflow benefits depend on the fabrics chosen. FIG. 11 illustrates that when the chair is viewed from the front, one will be able to make out the outline of the holes 17, 19 and the spaces between the ribs 21.

It is to be further understood that although the description is described in relation to a chair back, the invention is applicable to a seat, bed, lounger or any type of chair. Accordingly although various preferred embodiments of the present invention have been described, it is to be appreciated that variations may be made without departing from the spirit of the invention or the scope of the appended claims.

The invention claimed is:

1. An apparatus for a ventilated chair backing assembly comprising:
   a. a foam chair backing component with a first plurality of ventilation holes extending from a front surface to a back surface;
   b. a support component with a second plurality of ventilation holes extending from a front surface to a back surface aligned with the first plurality of holes;
   c. a ventilated backing cover component including a plurality of ventilation ribs wherein the ventilation ribs permit airflow from the aligned first and second plurality of ventilation holes; and
   d. the support component disposed intermediate the foam chair backing component and ventilated backing cover; and the support component has a surface comprised of a plurality of honeycomb shape cells, and wherein the internal support component comprises nylon wherein the plurality of ventilation ribs project laterally from a central support structure.

2. The apparatus of claim 1 wherein some of the honeycomb cells include said ventilation hole.

3. The apparatus claim 2 wherein said some of the honeycomb cells further include a land defining said holes and upstanding wall defining said honeycomb cells.

4. The apparatus of claims 3 wherein said upstanding walls are displayed adjacent said foams chair backing component.

* * * * *